Oct. 2, 1951        J. B. CATALDO        2,569,800
ELECTRICALLY MODULATED VALVE
Filed April 22, 1949
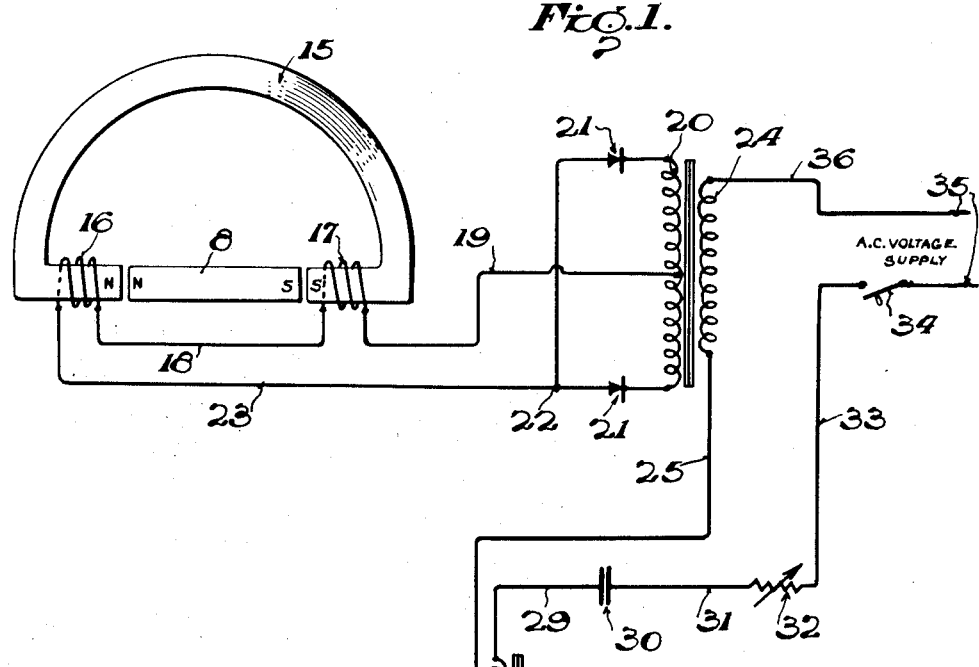
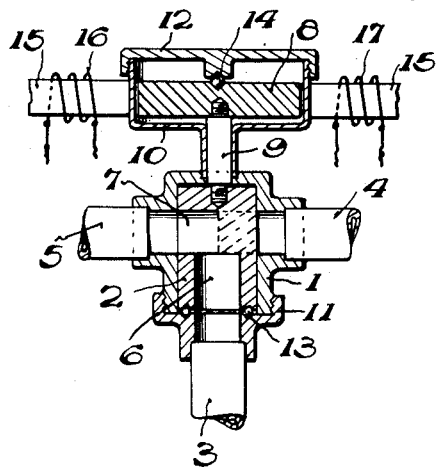
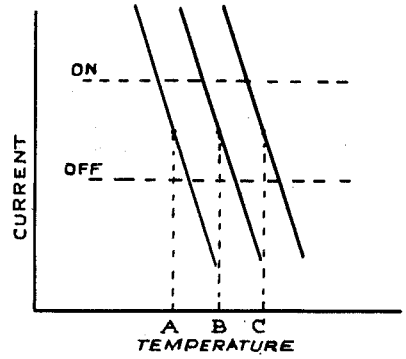
INVENTOR.
John B. Cataldo.
BY
Cameron, Kerkam & Sutton
ATTORNEYS Patented Oct. 2, 1951

2,569,800

UNITED STATES PATENT OFFICE 2,569,800

ELECTRICALLY MODULATED VALVE

John B. Cataldo, Bernardsville, N. J., assignor, by mesne assignments, to Thermal Liquids, Inc., New York, N. Y., a corporation of Delaware Application April 22, 1949, Serial No. 88,927

2 Claims. (Cl. 236—74)

This invention relates to the remote temperature-responsive control of modulating valves such as those used to control the supply of a fluid heating medium to an appliance or space to be heated so as to maintain a regulated temperature, although it can be used for other purposes if desired.

Most commercial temperature regulating systems of the above type employ a bulb containing a temperature-sensitive liquid and/or vapor, the expansion of which is utilized for modulation control of the valve regulating the supply of the heating medium. However, such systems are not well adapted for remote control applications, since the bulb must be connected to the valve by a thin capillary tube of definite length, and because the control knob is part of the valve body which is often remote from the point at which the temperature is to be controlled. Servomechanisms can be used in such cases, but at the expense of undesirable complication of the system and much higher cost.

One of the objects of the present invention is to provide a novel system of modulating valve control which utilizes electro-magnetic principles and hence can be extended to any remote point simply by using wires of sufficient length.

Another object is to provide such a system of a type that is adapted for use at any temperature within a continuous wide range subject only to the provision of suitable electric and magnetic constants.

A further object is to provide such a system in which the temperature to be maintained can be adjusted at the point where the heat is utilized, or at any other desired point, however remote from the valve itself or from the temperature-sensitive control device.

A still further object is to effect such temperature adjustments without interfering with or materially altering the modulating characteristics of the system.

Additional objects are to provide a system as characterized above which has a minimum of moving parts and mechanical devices, which is economical to manufacture and can be sold at comparatively low cost, and which is simple to install and adjust and reliable and efficient in operation.

It is known that magnetic materials become non-magnetic when heated above a temperature known as the Curie temperature, and that they lose their magnetic properties gradually as that temperature is approached, both flux saturation and permeability being affected. It is also known that when non-magnetic materials are alloyed or combined with magnetic materials, any desired Curie temperature between absolute zero and over 1000° C. can be produced. The magnetic properties of various such alloys have been investigated, such as binary nickel base alloys containing iron, copper, zinc, molybdenum, etc., ternary Fe-Ni-Cr alloys, quaternary Fe-Ni-Cr-Si alloy systems, etc. It is thus possible to provide an alloy having a Curie temperature such that its magnetic properties will vary in response to temperature changes in any of the ranges required for most commercial temperature controlling operations.

Systems embodying the invention utilize such temperature-sensitive magnetic alloys for temperature control by operating the control valve electro-magnetically in response to variations in the amount of current flowing in an energizing circuit including an inductive reactance having an alloy core the Curie temperature of which is above the temperature range to be controlled. The magnetic properties of the core, and consequently the amount of inductive reactance and the amount of current in the circuit, will then vary in response to temperature changes in said range, and the valve opening will be modulated as a function of the temperature to be controlled. The control valve can be motorized, or of the step-type, or operated by a solenoid or other suitable electro-magnetic means in response to variations in the amount of current in the energizing control circuit.

A simple and effective modulation can be obtained in many cases by the use of a rotary valve having a permanent magnet connected to the valve stem, the position of the magnet and consequently the valve opening being controlled by attraction or repulsion of the magnet relative to a stationary electro-magnetic field. Hence the valve will seek a definite position at which the temperature of the alloy and the ambient temperature to which it is exposed will be maintained constant. Moreover, this temperature can be adjusted very simply by adjusting the setting of a variable resistance in the control circuit, without materially affecting the modulating action of the system.

Systems of the type characterized above can be used for various purposes such as the control of mixing valves, heating or cooling systems, etc. Depending on the nature of the control to be effected and the type of electro-magnetic operating means employed, the control circuit may include only inductive reactance, in which case the impedance of the control circuit will decrease and the current therein will increase with rising temperature, or it may include both inductive and capacitive reactances so that its impedance increases and the current decreases with rising temperature.

The drawings show an embodiment of the invention intended particularly for the regulation of the flow of a fluid heating medium and comprising a rotary control valve, the current in the control circuit being rectified and supplied to the winding of a stationary electro-magnet the poles of which are opposed to like poles of a permanent magnet connected to the valve stem and operating the valve by magnetic repulsion. However, it will be understood that this embodiment is by way of example only and that the drawings are not to be taken as a definition of the limits of the invention, reference being had to the appended claims for this purpose.

In the drawings—

Fig. 1 is a diagrammatic illustration of a system of the above type;

Fig. 2 is a sectional view of the valve and valve operating means; and

Fig. 3 is a diagram illustrating the operation of the system.

Referring first to Fig. 2, the valve is of the rotary type having a casing 1 enclosing a rotary valve body 2. As shown, the valve is a three-way valve intended for controlling the flow of a liquid heating medium which enters the valve through the inlet pipe 3 and flows through passages in the valve body to either or both of the outlet pipes 4 and 5 depending on the position of the valve body. One of these outlets, such as the pipe 4, leads to the appliance to be heated, and the other outlet 5 is a bypass which returns the heating medium to the supply. The valve body 2 has an inlet passage 6 communicating with the inlet pipe 3 at all times, and one or more outlet passages as shown at 7 whereby the heating medium passes to the outlet pipe 4 or 5.

In the position shown in Fig. 2, the valve is closed with respect to the outlet pipe 4 and the appliance to be heated and all of the heating medium is returned to the supply line. As the valve body is rotated from this position, however, the outlet 5 is gradually closed while the outlet 4 is gradually opened, distributing the flow through both outlets until the full open position is reached in which the outlet 5 is completely closed while the outlet 4 is fully open. Preferably the relative valve openings to the outlets 4 and 5 are such that the area of flow through the valve is unrestricted from closed to open position. Inasmuch as the intake flow is in a direction at right angles to the angular motion of the valve body, dynamic forces from the flow of the heating medium have little or no effect on the rotary motion of the valve. Clearances between the valve body and the casing are kept at a balance for freedom of rotation and minimum leakage.

The valve body 2 is rotated in its casing 1 by means of a permanent magnet 8 which is mechanically attached to the valve body by means of an extension shaft 9 of non-magnetic material. The magnet and shaft are surrounded by a casing 10 sealed to the valve casing 1, and the unit is closed by caps 11 and 12 screwed on the casings 1 and 10 respectively and sealed thereto. The unit is made as nearly frictionless as possible, as by means of ball bearings 13 between the lower end of the valve body and the screw cap 11, and a ball bearing 14 between the magnet 8 and the screw cap 12. The screw caps are tightened to take up all axial play and then preferably seal brazed to the casings 1 and 10.

The poles of the permanent magnet 8 are opposed to like poles of an electro-magnet here shown as comprising a magnetic structure 15 and windings 16 and 17. When these windings are energized, therefore, the permanent magnet 8 is repelled and the valve body is moved from its normal closed position shown in Fig. 2 toward open position. The amount of such opening movement will depend on the strength of the permanent magnet and the magnitude of the restoring force acting on the valve, which are fixed, and on the strength of the electro-magnetic field which is a function of the amount of current flowing in the windings 16 and 17.

Fig. 1 illustrates an energizing and controlling circuit of the type mentioned above. The windings 16, 17 are connected in series with each other by an intermediate wire 18. The outer end of winding 17 is connected by a wire 19 with the center tap of a transformer secondary 20. The two ends of this secondary are connected through suitable rectifiers 21, preferably of the dry disc type, to a common point 22 which is connected by a wire 23 to the outer end of the winding 16. This arrangement provides full wave rectification of the current in the transformer secondary and supplies the rectified current to the windings 16 and 17 in series.

The control circuit per se includes a transformer primary winding 24, one end of which is connected by a wire 25 to a temperature sensitive element in the form of an inductive reactance 27 having a metallic core 28. This core is made of a Curie temperature alloy the magnetic properties of which vary in response to temperature changes in the range to be controlled. The constitution of the alloy may vary depending on the temperature conditions. Assuming a maximum temperature of the heating medium of about 800° F., an iron-nickel alloy composition comprising about 42% nickel may be used. The other end of the reactance 27 is connected by a wire 29 to a condenser 30 which, when combined with the inductive reactance 27, provides a rising impedance with increasing temperature. A wire 31 leads from the condenser 30 to a variable resistance 32 which is connected by a wire 33 to a line switch 34 in one side of the A. C. voltage supply leads 35, the other side of the supply being connected by a wire 36 to the transformer primary 24.

When the line switch 34 is closed, the current in the control circuit and in the electro-magnet windings 16, 17 is at a maximum because the temperature surrounding the control element 27 is low. Hence maximum repulsion of the permanent magnet 8 results and the rotary valve body 2 assumes its full open position so as to allow all of the heating medium to flow through the outlet pipe 4 to the appliance to be heated. With reference to Fig. 3, and assuming that temperature A is to be maintained, this condition is illustrated by the upper part of the curve above the dotted line marked "On." As the temperature surrounding the control element 27 rises, the impedance of the control circuit also rises and the current gradually falls, following the curve corresponding to temperature A. However, the valve will not start to close until the current falls to a design value corresponding to that indicated by the line "On." Thus maximum flow of the heating medium to the appliance continues until the desired temperature is almost reached. Beyond this point, however, further decrease in current allows the valve body to rotate, thereby diverting some of the heating medium into the outlet pipe 5 and decreasing the flow to the appliance. The rate of increase of the temperature is thus gradually reduced and the current in the windings 16, 17 is reduced correspondingly until the valve reaches a position at which the flow of heating medium through the outlet pipe 4 satisfies the demand for heat. Depending on the thermal lag of the heating system and the heated appliance, the valve may hunt between full open and full closed positions one or more times before it reaches an equilibrium stage.

The temperature that is to be maintained is regulated and can be adjusted by the setting of the variable resistance 32. For example, assuming that equilibrium has been reached at temperature A, a reduction in the amount of resistance in the control circuit will cause a corresponding increase in the amount of current flowing therein and in the windings 16, 17, with the result that the valve is further opened to increase the supply of heating medium to the appliance. The temperature of the appliance then increases and the current in the control circuit is again reduced to establish a new equilibrium at temperature B or C, etc. As illustrated in Fig. 3, the effect of changing the setting of the variable resistance 32 is to shift the current-temperature curve to the right or left in the diagram without materially affecting its slope or the modulating characteristics of the valve. Thus the variable resistance can be graduated directly in terms of the temperature to be maintained.

For remote control applications, it will be seen that the control valve can be located at one point in the system and controlled by the temperature sensitive element 27 at a distant point. Moreover the temperature to be maintained can be regulated by the variable resistance 32 either at the appliance, or at the valve, or at a control point remote from both the valve and the temperature sensitive element. Preferably, the valve, electro-magnet, transformer, rectifier and condenser will be combined in a single unit, the temperature sensitive element and the variable resistance being separately located at any desired point and connected to the unit by suitable wiring.

It will be understood that the invention is not limited to the foregoing embodiment or to the details of the description and drawings, and that reference should be had to the appended claims for a definition of its limits.

What is claimed is:

1. Apparatus of the class described comprising a control circuit, inductive and capacitive reactances in said circuit, said inductive reactance including a metallic core having magnetic properties which vary in response to temperature changes in the range to be controlled and the impedance of said circuit increasing as the temperature increases, a valve for controlling the flow of a heating medium, a permanent magnet connected to the valve stem, an electro-magnet having its poles opposed to like poles of said permanent magnet, and means for rectifying the current flowing in said circuit and supplying the rectified current to said electro-magnet to open said valve by magnetic repulsion.

2. Apparatus of the class described comprising a control circuit, inductive and capacitive reactances in said circuit, said inductive reactance including a metallic core having magnetic properties which vary in response to temperature changes in the range to be controlled and the impedance of said circuit increasing as the temperature increases, a valve for controlling the flow of a heating medium, a permanent magnet connected to the valve stem, an electro-magnet having its poles opposed to like poles of said permanent magnet, means for rectifying the current flowing in said circuit and supplying the rectified current to said electro-magnet to open said valve by magnetic repulsion, and a variable resistance in said circuit for adjusting the amount of current flowing therein and the amount of opening of said valve.

JOHN B. CATALDO.

REFERENCES CITED

The following references are of record in the file of this patent:

UNITED STATES PATENTS

| Number | Name | Date |
|---|---|---|
| 1,626,817 | Hammett | May 3, 1927 |
| 1,697,148 | Spooner | Jan. 1, 1929 |
| 2,013,424 | Rippe | Sept. 3, 1935 |
| 2,226,845 | Clark | Dec. 31, 1940 |
| 2,310,562 | Whittington | Feb. 9, 1943 |
| 2,320,881 | Newton | June 1, 1943 |
| 2,350,329 | Hornfeck | June 6, 1944 |
| 2,353,740 | Malone | July 18, 1944 |
| 2,460,773 | Stimson | Feb. 1, 1949 |

FOREIGN PATENTS

| Number | Country | Date |
|---|---|---|
| 2,740 | Great Britain | 1909 |
| 73,721 | Denmark | 1932 |
| 770,767 | France | 1934 |